United States Patent
Jachner

(10) Patent No.: US 7,570,752 B2
(45) Date of Patent: Aug. 4, 2009

(54) TELEPHONY/CONFERENCE ACTIVITY PRESENCE STATE

(75) Inventor: Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 749 days.

(21) Appl. No.: 11/233,987

(22) Filed: Sep. 23, 2005

(65) Prior Publication Data

US 2007/0081644 A1    Apr. 12, 2007

(51) Int. Cl.
  H04M 3/42 (2006.01)
(52) U.S. Cl. .............................. 379/202.01; 379/201.01
(58) Field of Classification Search ............ 379/202.01, 379/204.01
  See application file for complete search history.

(56) References Cited

U.S. PATENT DOCUMENTS

| | | | |
|---|---|---|---|
| 5,436,896 A | | 7/1995 | Anderson et al. |
| 6,314,178 B1 * | | 11/2001 | Walker et al. ........... 379/266.01 |
| 6,606,505 B1 | | 8/2003 | Chow et al. |
| 6,735,300 B2 * | | 5/2004 | Walker et al. ........... 379/266.01 |
| 7,236,580 B1 * | | 6/2007 | Sarkar et al. ............ 379/202.01 |
| 2005/0054361 A1 * | | 3/2005 | Turcanu et al. ............. 455/518 |
| 2005/0149876 A1 | | 7/2005 | Kortum et al. |

FOREIGN PATENT DOCUMENTS

| | | |
|---|---|---|
| WO | 9823080 A2 | 5/1998 |
| WO | 03069945 A1 | 8/2003 |

OTHER PUBLICATIONS

Technology White Paper "Rich Presence: A New User Communications Experience" 8 pages, copyrighted 1st quarter 2005.

* cited by examiner

*Primary Examiner*—Creighton Smith

(57) ABSTRACT

A presence system and method are described herein which infer a person's level of participation in a telephone call (e.g., multi-party conference call, one-on-one telephone call, collaboration session). In one embodiment, the presence system collects presence information about one or more activities of a person while they are also participating in a telephone call. The presence system aggregates and analyzes the collected presence information to determine a telephony/conference activity presence state which is then published to watchers and/or an automated interaction management system in order to inform them if the person happens to be an "active participant" or a "passive participant" in the telephone call. The watchers and/or the automated interaction management system can then use this information as a guide to determine if the person is likely to be able to respond to another interaction while that person is also participating in the telephone call. The inference is that a person who is "passive participant" is substantially more likely to engage in an IM or even a second phone interaction with another person (e.g., watcher) then if that person was an "active participant".

32 Claims, 2 Drawing Sheets

＃ TELEPHONY/CONFERENCE ACTIVITY PRESENCE STATE

BACKGROUND OF THE INVENTION

1. Field of the Invention

The present invention relates to a presence system and method that collects presence information about one or more activities of a person while they are also participating in a telephone call (e.g., multi-party conference call) and then determines a telephony/conference activity presence state which is used to inform other people (watchers) and/or an automated interaction management system if the person is an "active participant" or a "passive participant" in the telephone call.

2. Description of Related Art

A main function of a presence system is to improve communications between a watcher (or, caller) and a presentity (or, callee). In such a system, the communication efficiency for a specific watcher (or, caller) in contacting a specific presentity (or, callee) depends on how much the watcher knows about the real-time status of the presentity. For example, the watcher may like to know the following information prior to contacting the presentity:

Presence Information:
  Availability: Is the presentity available to be contacted?
  Activity: What is the current activity of the presentity?
  Local Time: Is this the right time to contact to the presentity?
  Devices/Media Types: How I can reach the presentity?
  More . . .
Communication Preferences:
  What is the presentity's preferred language?
  What is the presentity's preferred device?
  What is the presentity's preferred security mode/protocol?
  More . . .

This real-time presence information is typically used by the watcher to make an informed decision as to whether the presentity is currently available or unavailable for an interaction (e.g. phone call, IM). One such relevant presence information element indicates whether the presentity is "on the phone", with the inference that a person who is on the phone is likely to be occupied and not available for another interaction. This is often an adequate inference for most one-on-one phone calls, however in multi-party conference calls and in certain types of one-on-one phone calls this may not be an adequate inference.

For example, if a multi-party conference call is taking place in a formal business setting, then there is typically only one or a few participants speaking (termed active), while the rest of the participants are listening more or less attentively (termed passive). These passive participants may be engaged in another activity such as responding to email, working on their PC, etc. . . and may be available for another interaction. And, if the person happens to be participating in a one-on-one phone call where they are simply listing to, for example, an analyst meeting or a training session, then they may also be available for another interaction. This is especially true if the person is engaged in another activity such as responding to email, working on their PC, etc . . . at the same time they are listening to the analyst meeting or training session.

As can be seen, the current "on the phone" presence state may be too harsh a indicator if a person happens to be a passive participant in a telephone call. For example, if a watcher knows a person is "on the phone" then they may be reluctant to try and contact that person even though that person may be able to engage in another interaction like an IM or a second phone (e.g., mobile phone) call while they are also "participating" in the telephone call. The lack of such knowledge about a passive participant that is taking part in a telephone call can result in degraded communications satisfaction for a watcher and the passive participant. This problem is solved by the present invention.

BRIEF DESCRIPTION OF THE INVENTION

The present invention includes a presence system and method which infer a person's level of participation in a telephone call (e.g., multi-party conference call, one-on-one telephone call, collaboration session). In one embodiment, the presence system collects presence information about one or more activities of a person while they are also participating in a telephone call. The presence system aggregates and analyzes the collected presence information to determine a telephony/conference activity presence state which is then published to watchers and/or an automated interaction management system in order to inform them if the person happens to be an "active participant" or a "passive participant" in the telephone call. The watchers and/or the automated interaction management system can then use this information as a guide to determine if the person is likely to be able to respond to another interaction while that person is also participating in the telephone call. The inference is that a person who is "passive participant" is substantially more likely to engage in an IM or even a second phone interaction with another person (e.g., watcher) then if that person was an "active participant".

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
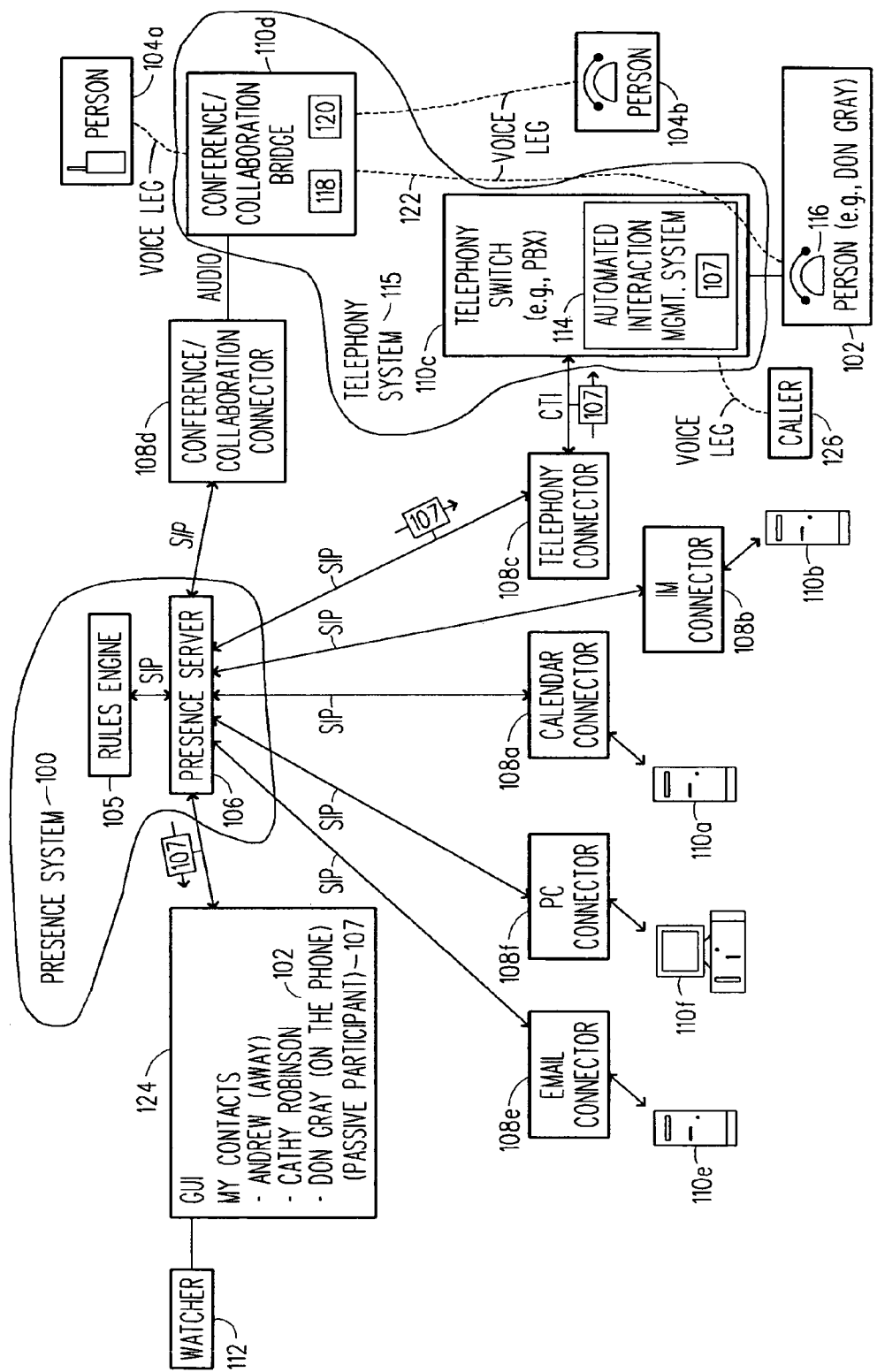
FIG. 1 is a block diagram illustrating the basic components of a presence system that determines and publishes a telephony/conference activity presence state which indicates a person's level of participation in a telephone call (e.g., multi-party conference call) in accordance with the present invention.
Figure 2:
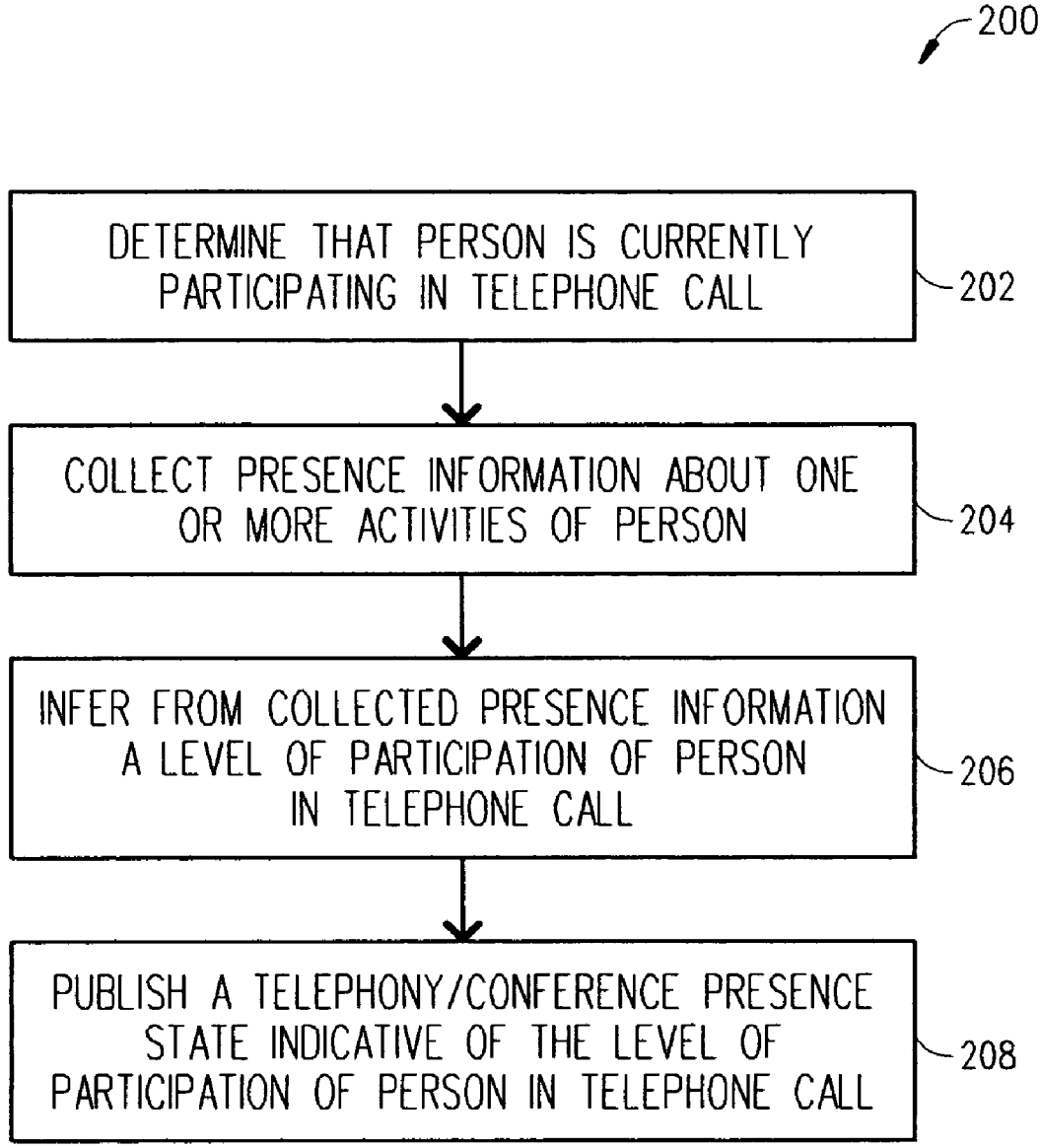
FIG. 2 is a flowchart of the basic steps of the method for determining and publishing a telephony/conference activity presence state which indicates a person's level of participation in a telephone call (e.g., multi-party conference call) in accordance with the present invention.

Referring to FIGS. 1-2, there are disclosed a preferred embodiment of a presence system 100 and a method 200 that are capable of determining and publishing a telephony/conference activity presence state 107 which indicates a person's level of participation in a telephone call (e.g., multi-party conference call). Although the present invention is described herein using an example where the person 102 is participating in a multi-party conference call, it should be understood that the present invention can also be used if the person 102 is participating in a one-on-one telephone call where, for example, they may be listening to a training session or an analyst meeting. Moreover, the present invention can be used if the person 102 is participating in a collaboration session where, for example, the participants communicate on-line and share information and edit documents using a whiteboard presentation or a power point presentation. Accordingly, the present invention should not be construed in a limited manner.

Referring to FIG. 1, there is illustrated a basic diagram of the presence system 100 that is able to infer the level of participation that a person 102 has in a multi-party conference call with several other people 104a and 104b (only two shown). The presence system 100 includes a rules engine 105 which is connected to a presence server 106. Alternatively, the rules engine 105 could be co-located with the presence server 106. In either case, the presence server 106 is coupled via multiple Session Initiation Protocol (SIP) interfaces (for example) to various connectors 108a, 108b ... 108f which in turn are coupled to various devices 110a, 110b ... 110f. In the example shown, the connectors 108 include a calendar connector 108a, an IM connector 108b, a telephony connector 108c, a conference collaboration/conference connector 108d, an email connector 108e and a PC connector 108f. And, the devices 110 include a calendar server 110a, an IM server 110b, a telephony switch 110c, a conference collaboration/ conference audio bridge 110d, an email server 110e and a PC 110f. The connectors 108a, 108b ... 108f and devices 110a, 110b ... 110f can be distributed (as shown) or co-located (not shown). For clarity, the description provided herein about the presence system 100, the various connectors 108a, 108b ... 108f and the various devices 110a, 110b ... 110f omits certain details and components that are well known in the industry and are not necessary to understand the present invention.

To help describe the present invention, a discussion is provided first about how the presence server 106 collects information related to the real-time activities of person 102 from the connectors 108a, 108b ... 108f and the devices 110a, 110b ... 110f. And, then a discussion is provided about how the rules engine 105 uses the collected information to infer a telephony/conference activity presence state 107 which indicates if the person 102 (e.g., Don Gray 102) is an "active participant" or a "passive participant" in the multi-party conference call. Then, a discussion is provided about how the telephony/conference activity presence state 107 can be published to and then used by the watchers 112 and/or the automated interaction management system 114 (e.g., phone switch, automated assistant application) as a guide to determine if the person 102 is likely to be able to respond to another interaction at this time.

First, the presence engine 106 collects presence information about the real-time activities of the person 102 while they are also participating in a multi-party conference call. In one embodiment, the presence engine 106 collects information about the person's participation in the multi-party conference call from the telephony system 115 which includes a telephony switch 110c and a conference collaboration/conference audio bridge 110d. The telephony switch 110c can be anyone of a wide variety of switches including, for example, a private branch exchange (PBX) 110c (shown), a carrier switch, a mobile switch, or a voice switch. In operation, the telephone switch 110c (via the telephony connector 108c) can inform the presence engine 106 if a voice capable terminal 116 (e.g., landline phone (shown), mobile phone, PDA, PC) that is being used by person 102 has been switched to a mute mode or to a non-interruptible mode such as "do-not-disturb". And, the conference/collaboration audio bridge 110d has a voice activity detector (VAD) 118 that can be used to inform the presence engine 105 if the person 102 is currently talking or has been talking a lot over a certain period of time during the multi-party conference call. Alternatively, the conference/ collaboration audio bridge 110d can have an energy detector 120 that can be used to detect voice energy on a voice leg 122 which is being used by person 102. If the energy detector 120 monitors a substantial amount of energy at the present time or over a period of time, then it can be assumed that the person 102 is currently talking or has been talking a lot during the multi-party conference call.

In addition, the presence engine 106 can collect information about the person's level of participation in the multi-party conference call from the other devices 110a, 110b, 110e and 110f. For example, the presence engine 106 can collect information from the IM server 110b (via the IM connector 108b) which indicates whether or not the person 102 has sent any IM messages while they are participating in the multi-party conference call. Likewise, the presence engine 106 can also collect information from the email server 110e (via the email connector 108e) which indicates whether or not the person 102 has sent any email messages while they are participating in the multi-party conference call. The presence engine 106 can also collect information from the PC 110f (via the PC connector 108f) which indicates whether or not the person 102 has been typing on their keyboard while they are participating in the multi-party conference call Moreover, the presence engine 106 can collect information from the calendar server 110a (via the calendar connector 108a) about the multi-party conference call in which the person 102 may have indicated in their calendar beforehand when the conference call was going to take place and if they are going to be a "passive participant" or an "active participant". As can be seen, the presence engine 106 has the capability to interact with a wide variety of devices 110a, 110b ... 110f to obtain a wide variety of presence information related to the real-time activities of the person 102 while they are participating in a multi-party conference call.

Secondly, the rules engine 105 obtains the collected presence information and aggregates/analyzes the collected presence information to infer a telephony/conference activity presence state 107 which is indicative of the person's level of participation in the multi-party conference call. In the preferred embodiment, the telephony/conference activity presence state 107 indicates that the person 102 is either a "passive participant" or an "active participant" in the multi-party conference call. In operation, the rules engine 105 may set the telephony/conference activity presence state 107 to "active participant" if the presence information that is received from the telephone switch 110c indicates that the voice capable terminal 116 which is being used by person 102 is not in a mute mode. Or, the rules engine 105 may set the telephony/ conference activity presence state 107 to "active participant" if the presence information that is received from the conference/collaboration audio bridge 110d and in particular from the VAD 118 or the energy detector 120 indicates that the person 102 is currently talking or has been talking a lot over a predetermined period of time during the multi-party conference call.

The rules engine 105 may also set the telephony/conference activity presence state 107 to "active participant" after analyzing the presence information that is received by the presence sever 106 from some of the other devices 110a, 110b, 110e and 110f. For example, the rules engine 105 may set the telephony/conference activity presence state 107 to "active participant" if the collected presence information indicates that the person 102: (1) has not sent an IM message during the multi-party conference call; (2) has not sent an email message during the multi-party conference call; (3) if the person 102 has not been using the keyboard on their PC 110f during the multi-party conference call (this assumes that the PC 110f is not being used to make a presentation which is being used in the multi-party conference call); and/or (4) if the person 102 indicated in their calendar before the multi-party conference call was going to take place that they should be considered an "active participant". Of course, there may be other types of presence information not mentioned above that can be collected by the presence server 106 and analyzed by the rules engine 105 to determine the telephony/conference activity presence state 107.

In contrast, the rules engine 105 may set the telephony/conference activity presence state 107 to "passive participant" if the presence information that is received from the telephone switch 110*c* indicates that the voice capable terminal 116 being used by person 102 is currently in a mute mode. Or, the rules engine 105 may set the telephony/conference activity presence state 107 to "passive participant" if the presence information that is received from the conference/collaboration audio bridge 110*d* and in particular from the VAD 118 or the energy detector 120 indicates that the person 102 is not currently talking or has not talked much over a predetermined period of time during the multi-party conference call.

The rules engine 105 may also set the telephony/conference activity presence state 107 to "passive participant" after analyzing the presence information that is received by the presence server 106 from some of the other devices 110*a*, 110*b*, 110*e* and 110*f*. For example, the rules engine 105 may set the telephony/conference activity presence state 107 to "passive participant" if the collected presence information indicates that the person 102: (1) has sent one or more IM messages during the multi-party conference call; (2) has sent one or more email messages during the multi-party conference call; (3) if the person 102 has been using the keyboard on their PC 110*f* during the multi-party conference call (this assumes that the PC 110*f* is not being used to make a presentation which is being used in the multi-party conference call); and/or (4) if the person 102 indicated in their calendar before the multi-party conference call was going to take place that they should be considered an "passive participant". Of course, there may be other types of presence information not mentioned above that can be collected by the presence information 106 and analyzed by the rules engine 105 to determine the telephony/conference activity presence state 107.

In one embodiment, the person 102 may even preempt the rules engine 105 and manually indicate that they want be considered an "active participant" or a "passive participant" during a particular multi-party conference call. In addition, the person 102 may pre-configure the rules engine 105 so that it sets the telephony/conference activity presence state 107 to either an "active participant" or a "passive participant" for a particular multi-party conference call which takes place at the same time and day every week or month. In this way, the person 102 has a manual option to set their own telephony/conference activity presence state 107 to manage their communicated presence state and to manage any incoming interaction requests that may occur during the multi-party conference call.

Thirdly, the presence server 106 publishes/distributes the telephony/conference activity presence state 107 to one or more consumers which are described herein as being the watchers 112 and/or the automated interaction management system 114 (shown located at the PBX 110*c*). The watchers 112 (one shown) may use a graphical user interface (GUI) 124 to see the telephony/conference activity presence state 107 for a particular person 102. In the example shown, the person 102 is Don Gray and his telephony/conference activity presence state 107 is set to "passive participant". The watcher 112 can use this information to determine if Don Gray 102 is likely to be able to respond to another interaction at this time, with the inference that since Don Gray 102 is a "passive participant" then he is likely to be able to engage in an IM or even a second phone interaction while he is also participating in the multi-party conference call.

However, before this watcher 112 or any other watcher 112 can receive the person's presence information including the telephony/conference activity presence state 107 they need to subscribe with the presence server 106 and indicate that they want to obtain this person's presence information. The rules engine 105 may not let certain watcher(s) 112 receive certain types of presence information in view of preference rules/policies. Typically, the person 102 and/or the person's employer establishes these preference rules/policies. For instance, the person 102 may establish preference rules/policies that dictate where only a certain watcher 112 (e.g., manager 112) can obtain certain types of presence information like the telephony/conference activity presence state 107.

As indicated above, the automated interaction management system 114 may also receive the person's telephony/conference activity presence state 107. In this case, the automated interaction management system 114 may inform other callers 126 (only one shown) that the person 102 is or is not currently participating in the multi-party conference call. And, if they are participating in a multi-party conference call, then the automated interaction management system 114 may inform the caller 126 about whether the person 102 is an "active participant" or a "passive participant". Then, the caller 126 (not a watcher 112) can use this information to determine if the person 102 is likely to be able to respond to another interaction at this time, with the inference that if the person 102 is a "passive participant" then they are more likely to engage in an IM or even a second phone interaction then if the person 102 is an "active participant".

Referring to FIG. 2, there is a flowchart of the basic steps of the method 200 for determining and publishing a telephony/conference activity presence state 107 which indicates a person's level of participation in a telephone call (e.g., multi-party conference call, collaboration session or one-on-one call). Beginning at step 202, the presence server 106 determines that the person 102 is participating in a telephone call. At step 204, the presence server 106 collects presence information about one or more real-time activities of the person 102 while they also happen to be participating in the telephone call. At step 206, the rules engine 106 uses the collected presence information to infer a telephony/conference activity presence state 107 which is indicative of the person's level of participation in the telephone call. As indicated above, the telephony/conference activity presence state 107 can be set to "active participant" or "passive participant". However, it should be appreciated that the telephony/conference activity presence state 107 could also be set based on some other scale or terminology instead of "active participant" and "passive participant". At step 208, the presence server 106 publishes/distributes the called party's telephony/conference activity presence state 107 to the watcher 112 and/or the automated interaction management system 114. This presence information 107 is then used to help guide the watcher 112 (or caller 126) about whether the person 102 is likely to respond to another interaction while they are also taking part in the telephone call. A more detailed discussion about these steps has been provided above with respect to FIG. 1.

Following are some additional features, advantages and uses of the present invention:

The present invention improves the communication efficiency and satisfaction of presence watchers 112 (customers, callers). For instance, the communication of telephony/conference activity via presence information would automatically deter or automatically deflect interruptions to enhance the productivity of individuals in a conference call/collaboration session that are active participants and prefer not to be interrupted. And, the communication of telephony/conference activity via presence information would permit participants that are passive to be reached by others wishing to interact with them in urgent or important matters, even though they are taking part in a conference call/collaboration session.

A net return on investment (ROI) for the present invention can be calculated for the time benefit to enterprises/companies. For example, an information worker spends an average of one hour per day in conference calls, and 80% of the time as a "passive participant", resulting in 200 hours/year that the worker is not reachable by others. If the present invention is used then this worker may be reachable another 200 hours/year which is a 10% increase in ROI if the worker is assumed to work 2000 hours/year.

The presence system 100 and method 200 can support any number of presentities 102 (people 102), callers 126, presence watchers 112 and automated interaction management systems 114 although only one of each was shown and described herein.

The presence server 106 can collect presence information from a voice capable terminal 116 about whether or not the voice capable terminal 116 has been switched to a mute mode by the person 102 participating in the telephone call.

The presence server 106 can collect presence information from an intelligent terminal (e.g., PC 110*f*) about whether or not the voice capable terminal 116 has been switched to a mute mode by the person 102 participating in the telephone call.

Although one embodiment of the present invention has been illustrated in the accompanying Drawings and described in the foregoing Detailed Description, it should be understood that the invention is not limited to the embodiment disclosed, but is capable of numerous rearrangements, modifications and substitutions without departing from the spirit of the invention as set forth and defined by the following claims.

What is claimed is:

1. A presence system comprising:
   a presence server for collecting presence information about a person that is participating in a telephone call; and
   a rules engine for aggregating the presence information and analyzing the aggregated presence information to determine a telephony/conference activity state which indicates whether the person is an active participant or a passive participant in the telephone call; and
   said presence server for publishing the telephony/conference activity state to at least one consumer to guide that at least one consumer about whether the person is likely to respond to another interaction while the person is also participating in the telephone call.

2. The presence system of claim 1, wherein said telephone call is:
   a one-on-one telephone call;
   a multi-party conference call; or
   a collaboration session.

3. The presence system of claim 1, wherein said presence server collects at least a portion of the presence information about the person participating in the telephone call from a telephony connector and a conference/collaboration connector that are connected to a telephony system.

4. The presence system of claim 3, wherein said telephony system includes a telephone switch and a conference/collaboration bridge.

5. The presence system of claim 4, wherein said telephone switch informs said presence server if a voice capable terminal has been switched to a mute mode by the person participating in the telephone call.

6. The presence system of claim 4, wherein said conference/collaboration bridge informs said presence server if the person participating in the telephone call is or has been using a voice capable terminal by monitoring voice activity and/or voice energy on a leg of the telephone call.

7. The presence system of claim 4, wherein said telephone switch is one of the following:
   a private branch exchange (PBX);
   a carrier switch;
   a mobile switch; or
   a voice switch.

8. The presence system of claim 1, wherein said presence server collects the presence information about the person from connectors that interface with at least one of the following:
   a telephony system;
   a personal computer;
   a calendar server;
   an Instant Message server; and
   an email server.

9. The presence system of claim 1, wherein said rules engine disregards the aggregated presence information and sets the telephony/conference activity state based on a manual intervention by the person participating in the telephone call.

10. The presence system of claim 1, wherein said rules engine disregards the aggregated presence information and sets the telephony/conference activity state based on a pre-configured preference established by the person participating in the telephone call.

11. The presence system of claim 1, wherein said rules engine uses preference rules/policies to determine the at least one consumers which are approved to obtain the telephony/conference activity state.

12. The presence system of claim 1, wherein said at least one consumer is:
   a watcher; and/or
   an automated interaction management system.

13. The presence system of claim 1, wherein said presence server collects presence information from a voice capable terminal about whether or not the voice capable terminal has been switched to a mute mode by the person participating in the telephone call.

14. The presence system of claim 1, wherein said presence server collects presence information from an intelligent terminal about whether or not a voice capable terminal has been switched to a mute mode by the person participating in the telephone call.

15. A method for determining a level of participation of a person participating in a telephone call, said method comprising the steps of:
   determining that the person is currently participating in the telephone call;
   collecting presence information about one or more activities of the person while they are participating in the telephone call;
   inferring, from the collected presence information, a telephony/conference activity presence state that is indicative of a level of participation by the person participating in the telephone call; and publishing the telephony/conference activity presence state.

16. The method of claim 15, wherein said telephone call is:
a one-on-one telephone call;
a multi-party conference call; or
a collaboration session.

17. The method of claim 15, wherein said presence information is collected at least in part from a telephony connector and a conference/collaboration connector that are connected to a telephony system.

18. The method of claim 17, wherein said telephony system includes a telephone switch and a conference/collaboration bridge.

19. The method of claim 18, wherein said telephone switch informs a presence server if a voice capable terminal has been switched to a mute mode by the person participating in the telephone call.

20. The method of claim 18, wherein said conference/collaboration bridge informs a presence server if the person participating in the telephone call is or has been using a voice capable terminal by monitoring voice activity and/or voice energy on a leg of the telephone call.

21. The method of claim 18, wherein said telephone switch is one of the following:
a PBX;
a carrier switch;
a mobile switch; or
a voice switch.

22. The method of claim 15, wherein said presence information is collected from connectors that interface with at least one of the following:
a telephony system;
a personal computer;
a calendar server;
an Instant Message server; and/or
an email server.

23. The method of claim 15, wherein said person manually Sets the telephony/conference activity presence state irregardless of an outcome of the inferring step.

24. The method of claim 15, wherein said person manually pre-configures the telephony/conference activity presence state irregardless of an outcome of the inferring step.

25. The method of claim 15, further comprising a step of using preference rules/policies to determine which consumers should receive the published telephony/conference activity presence state.

26. The method of claim 25, wherein said consumers include:
a watcher; and/or
an automated interaction management system.

27. The method of claim 15, wherein said presence information is collected from a voice capable terminal which indicates whether or not the voice capable terminal has been switched to a mute mode by the person participating in the telephone call.

28. The method of claim 15, wherein said presence information is collected from an intelligent terminal about whether or not a voice capable terminal has been switched to a mute mode by the person participating in the telephone call.

29. A presence system comprising:
a presence server that collects presence information about one or more activities of a person participating in a multi-party conference call/collaboration session, where the presence information is collected at least in part from a telephony system which indicates at least one of the following: (a) if a voice capable terminal has been switched to a mute mode by the person participating in the multi-party conference call/collaboration session, (b) if the person participating in the multi-party conference call/collaboration session is or has been using the voice capable terminal by monitoring voice activity, and (c) voice energy on a leg of the multi-party conference call/collaboration session; and
a rules engine that analyzes the collected presence information and infers a telephony/conference activity presence state that is indicative of a level of participation by the person participating in the multi-party conference call/collaboration session; and
said presence server that publishes the telephony/conference activity presence state to one or more consumers to guide each consumer about whether the person is likely to respond to another interaction while the person is also participating in the multi-party conference call/collaboration session.

30. The presence system of claim 29, wherein said rules engine uses preference rules/policies to determine the one or more consumers which are approved to obtain the telephony/conference activity presence state.

31. A presence system comprising:
a presence server for collecting presence information about a person that is participating in a telephone call; and
a rules engine for aggregating the presence information and analyzing the aggregated presence information to determine a telephony/conference activity state which indicates whether the person is an active participant or a passive participant in the telephone call;
said presence server being adapted for publishing the telephony/conference activity state to at least one consumer to guide that at least one consumer about whether the person is likely to respond to another interaction while the person is also participating in the telephone call; and
said presence server being adapted for collecting presence information from a voice capable terminal or from an intelligent terminal about whether or not the voice capable terminal has been switched to a mute mode by the person participating in the telephone call.

32. A method for determining a level of participation of a person participating in a telephone call, said method comprising the steps of:
determining that the person is currently participating in the telephone call;
collecting presence information about one or more activities of the person while they are participating in the telephone call;
inferring, from the collected presence information, a telephony/conference activity presence state that is indicative of a level of participation by the person participating in the telephone call; and
publishing the telephony/conference activity presence state, wherein the presence information is collected from a voice capable terminal or from an intelligent terminal which indicates whether or not the voice capable terminal has been switched to a mute mode by the person participating in the telephone call.

* * * * *